United States Patent
Jo et al.

(10) Patent No.: US 8,178,622 B2
(45) Date of Patent: May 15, 2012

(54) AMPHIPHILIC BLOCK COPOLYMER, METHOD FOR MANUFACTURING THE SAME, AND POLYMER ELECTROLYTE MEMBRANE USING THE SAME

(75) Inventors: Won Ho Jo, Gyeonggi-do (KR); Tae-Ann Kim, Seoul (KR); In Chul Hwang, Gyeonggi-do (KR); Nak Hyun Kwon, Seoul (KR)

(73) Assignees: Hyundai Motor Company, Seoul (KR); SNU R&DB Foundation, Seoul (KR)

( * ) Notice: Subject to any disclaimer, the term of this patent is extended or adjusted under 35 U.S.C. 154(b) by 116 days.

(21) Appl. No.: 12/885,841

(22) Filed: Sep. 20, 2010

(65) Prior Publication Data

US 2011/0201756 A1 Aug. 18, 2011

(51) Int. Cl.
| | |
|---|---|
| *C08F 8/00* | (2006.01) |
| *C08F 12/30* | (2006.01) |
| *C08F 28/02* | (2006.01) |
| *C08F 20/44* | (2006.01) |
| *C08F 12/02* | (2006.01) |
| *C08F 112/06* | (2006.01) |

(52) U.S. Cl. ............ 525/150; 526/346; 526/347.1; 526/341; 526/287; 526/286

(58) Field of Classification Search .......... 525/150; 526/346, 347.1, 341, 287, 286
See application file for complete search history.

(56) References Cited

U.S. PATENT DOCUMENTS

| | | | |
|---|---|---|---|
| 7,258,941 B2 | 8/2007 | Hirano et al. | |
| 2008/0261100 A1* | 10/2008 | Onuma et al. | 429/33 |

FOREIGN PATENT DOCUMENTS

| | | |
|---|---|---|
| JP | 2004346305 A | 12/2004 |
| JP | 2005126684 A | 5/2005 |
| JP | 2007119511 A | 5/2007 |

* cited by examiner

*Primary Examiner* — William Cheung
(74) *Attorney, Agent, or Firm* — Edwards Wildman Palmer LLP; Peter F. Corless

(57) ABSTRACT

The present invention provides an amphiphilic block copolymer, a method for manufacturing the same, and a fuel cell membrane using the same. According to preferred embodiments, the amphiphilic block copolymer may contain poly(arylene sulfone ether ketone) (PSEK) as a hydrophobic component and poly(sulfonated styrene-co-acrylonitrile) (PSSAN) as a hydrophilic component. According to other preferred embodiments, polymer electrolyte membrane manufactured using the amphiphilic block copolymer has certain advantages in that the hydrogen ion conductivity is not reduced even at a high temperature of more than 100° C. but is rather increased and the thermal and chemical dimensional stability is excellent.

10 Claims, 10 Drawing Sheets

Retention time(min)

AMPHIPHILIC BLOCK COPOLYMER, METHOD FOR MANUFACTURING THE SAME, AND POLYMER ELECTROLYTE MEMBRANE USING THE SAME

CROSS-REFERENCE TO RELATED APPLICATION

This application claims under 35 U.S.C. §119(a) the benefit of Korean Patent Application No. 10-2010-0013909 filed Feb. 16, 2010, the entire contents of which are incorporated herein by reference.

BACKGROUND (a) Technical Field

The present disclosure relates, generally, to an electrolyte membrane for a fuel cell. More particularly, it relates to a novel amphiphilic block copolymer, a method for manufacturing the same, and a polymer electrolyte membrane using the same.

(b) Background Art

As an electrolyte membrane for a polymer electrolyte membrane fuel cell (PEMFC), fluorine electrolyte membranes are typically used. Although the fluorine electrolyte membranes have high chemical and mechanical stability and show excellent ion conductivity, the manufacturing cost is high due to a complicated manufacturing process and they show significant performance deterioration at a temperature of more than 80° C. Accordingly, hydrocarbon electrolyte membranes such as PAES, sPEEK, sPPBP, PI, etc. have been reported. However, a large amount of hydrophilic groups are required to improve the ion conductivity, which can cause a problem in the dimensional stability due to high moisture-containing properties of the membrane. The low dimensional stability has a bad effect on the manufacturing process of a membrane-electrode assembly (MEA) and its long-term stability. As a result, block copolymer polymer electrolyte membranes have been proposed. Block copolymers exhibit high ion conductivity and excellent dimensional stability even at low moisture content.

Nafion membranes (Dupont) are most commonly used as proton exchange membranes (PEMs) and have high hydrogen ion conductivity and excellent chemical stability. It is known that such a high hydrogen ion conductivity results from the microphase separation of hydrophilic and hydrophobic groups. However, the manufacturing cost is high and they show significant performance deterioration at a temperature of more than 80° C. Especially, in the case where the polymer electrolyte membrane fuel cell is operated at a high temperature of more than 100° C., (1) the resistance of platinum catalyst to impurities is increased, (2) the reaction rate at oxidation and reduction electrodes is increased, (3) the management of water in the fuel cell is easy, and (4) the cooling system is simplified. Accordingly, there is an urgent need in the art to develop a high-temperature polymer electrolyte membrane fuel cell (PEMFC). To this end, extensive research on sulfonated poly(ether ether ketone), sulfonated poly(arylene ether sulfone), etc. using engineering plastics having excellent thermal and mechanical stability has continued to progress to develop an electrolyte membrane which can be operated at high temperatures. However, in cases where these engineering plastics are used, the microphase separation between the hydrophilic and hydrophobic components, which is required to form ion channels, is not satisfactory.

Therefore, the inventors of the present invention have tried to develop an alternative electrolyte membrane which can solve the above-described problems and, as a result, have developed a novel amphiphilic block copolymer, and an electrolyte membrane for a fuel cell including the same.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a novel amphiphilic block copolymer designed to have suitably high hydrogen ion conductivity and to exhibit excellent mechanical properties, a method for manufacturing the amphiphilic block copolymer, and a polymer electrolyte membrane using the amphiphilic block copolymer.

In a preferred embodiment, the present invention provides an amphiphilic block copolymer containing poly(arylene sulfone ether ketone) (PSEK) as a hydrophobic component and poly(sulfonated styrene-co-acrylonitrile) (PSSAN) as a hydrophilic component. In particular preferred aspects, the present invention provides an amphiphilic block copolymer containing a hydrophobic component having a structure represented by the following general formula 1 and a hydrophilic component having a structure represented by the following general formula 2:

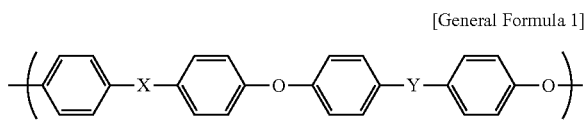

[General Formula 1]

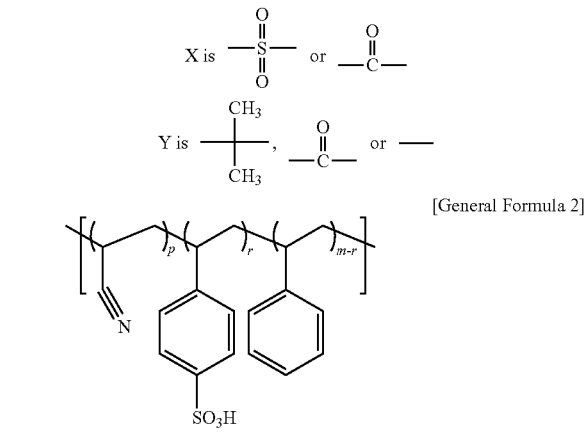

[General Formula 2]

In general formula 2, p, m, and r are independent integers, and m is greater than r (m>r).

In another aspect, the present invention provides a method for manufacturing an amphiphilic block copolymer, the method including modifying poly(arylene sulfone ether ketone) (PSEK) to a PSEK macroinitiator, synthesizing a PSEK-b-poly(styrene-co-acrylonitrile) (PSEK-b-PSAN) block copolymer by copolymerizing the PSEK macroinitiator with styrene and acrylonitrile, and sulfonating the PSEK-b-PSAN block copolymer.

In still another aspect, the present invention provides a polymer electrolyte membrane for a fuel cell containing the amphiphilic block copolymer.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
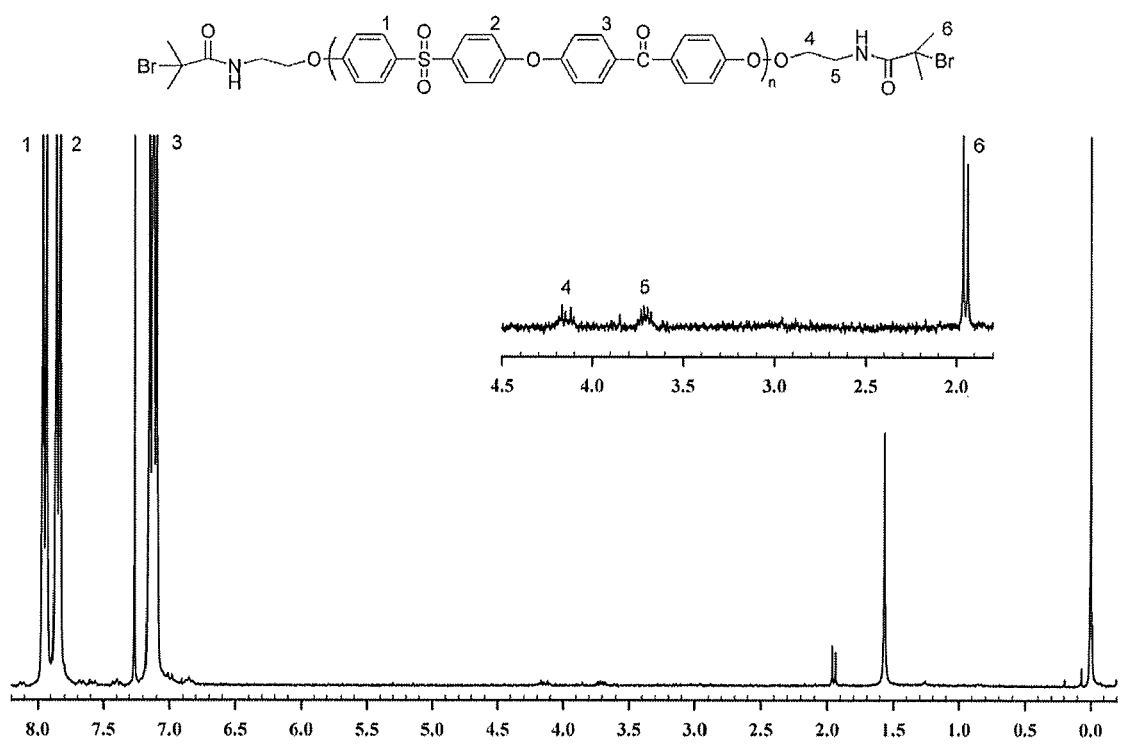
FIG. 1 shows the chemical structure of a PSEK macroinitiator synthesized in Example 1 and its 1H NMR spectra.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a block copolymer comprising at least one of each of a hydrophobic component having a structure represented by the following general formula 1 and a hydrophilic component having a structure represented by the following general formula 2:

[General Formula 1]

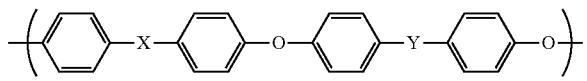

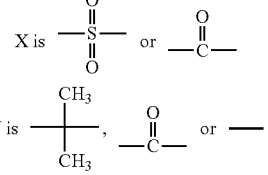

[General Formula 2]

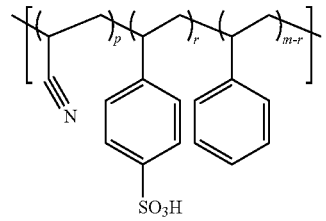

wherein, p, m, and r are independent integers, and m is greater than r (m>r).

The present invention also features a method for manufacturing an amphiphilic block copolymer, the method comprising modifying poly(arylene sulfone ether ketone) (PSEK) to a PSEK macroinitiator, synthesizing a PSEK-b-poly(styrene-co-acrylonitrile) (PSEK-b-PSAN) block copolymer by copolymerizing the PSEK macroinitiator with styrene and acrylonitrile; and sulfonating the PSEK-b-PSAN block copolymer.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an amphiphilic block copolymer containing at least one of each of a hydrophobic component and a hydrophilic component. In preferred embodiments, the present invention provides a block copolymer (e.g., a PSEK-b-PSSAN block copolymer) containing a hydrophobic component having a structure represented by the following general formula 1 and a hydrophilic component having a structure represented by the following general formula 2:

[General Formula 1]

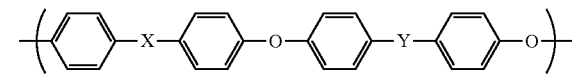

-continued

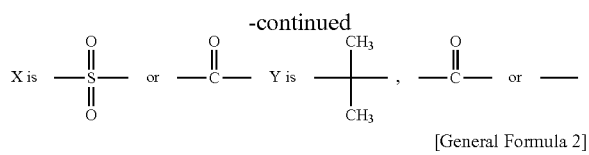

[General Formula 2]

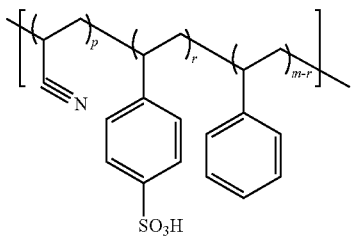

In general formula 2, p, m, and r are independent integers, and m is greater than r (m>r).

Preferably, the PSEK-b-PSSAN block copolymer may be manufactured by a method including modifying poly(arylene sulfone ether ketone) (PSEK) to a PSEK macroinitiator, synthesizing a PSEK-b-PSAN block copolymer by copolymerizing the PSEK macroinitiator with styrene and acrylonitrile, and sulfonating the PSEK-b-PSAN block copolymer.

In further preferred embodiments, the process of modifying the PSEK to the PSEK macroinitiator may preferably include substituting an end group of the PSEK with an amine group protected by a butoxycarbonyl group (Boc), removing the protecting butoxycarbonyl group (Boc), and introducing bromine into the end group.

Preferably, in further preferred embodiments, the process of synthesizing the PSEK-b-PSAN block copolymer may include mixing and stirring styrene, acrylonitrile, and Me6TREN, and adding the PSEK macroinitiator to the stirred solution to be polymerized.

Furthermore, the process of sulfonating the PSEK-b-PSAN may preferably include dissolving the PSEK-b-PSAN block copolymer in methylene chloride, and mixing the methylene chloride with acetyl sulfate.

According to certain preferred embodiments, in the PSEK-b-PSSAN block copolymer of the present invention, the hydrophilic component may be suitably contained in an amount of 50 to 300 parts by mass with respect to 100 parts by mass of the hydrophobic component. Preferably, if the amount of hydrophilic component used is less than 50 parts by mass, the chain length of the hydrophilic component is short, and thus it is difficult to form well-connected hydrogen ion channels. Whereas, if it exceeds 300 parts by mass, a phase inversion may occur due to a long chain length of the hydrophilic component, and thus it is undesirable in view of the mechanical properties. More preferably, according to other further preferred embodiments, the hydrophilic component may be used in an amount of 250 to 300 parts by mass to increase the hydrogen ion conductivity. A reason for this is that among a variety of morphologies, a lamellar structure can provide the highest hydrogen ion conductivity.

In certain exemplary embodiments, in the PSEK-b-PSSAN block copolymer of the present invention, the degree of sulfonation may be in a range of 1 to 10%.

According to further preferred embodiments, the present invention preferably provides an electrolyte membrane using the block copolymers as the main components. Preferably, since the block copolymers have both hydrophobic and hydrophilic groups, they have high hydrogen ion conductivity and excellent thermal, chemical, and mechanical stability even at high temperatures, and thereby they are very suitable as the main components of the electrolyte membrane. According to further preferred embodiments, the electrolyte membrane may be suitably manufactured by dissolving a block copolymer in dimethylformamide (DMF), casting the resulting solution on a glass plate to prepare an electrolyte membrane, and allowing the cast electrolyte membrane to be subjected to solvent annealing, and drying the resulting electrolyte membrane.

The present invention will be described in further detail with reference to Preparation Examples. It is to be understood that the following Preparation Examples are illustrative only, and the scope of the present invention is not limited thereto.

Preparation Example 1

Synthesis of Poly(arylene sulfone ether ketone) Macroinitiator

The overall synthesis method according to certain preferred embodiments is represented by the following formula 1:

[Formula 1]

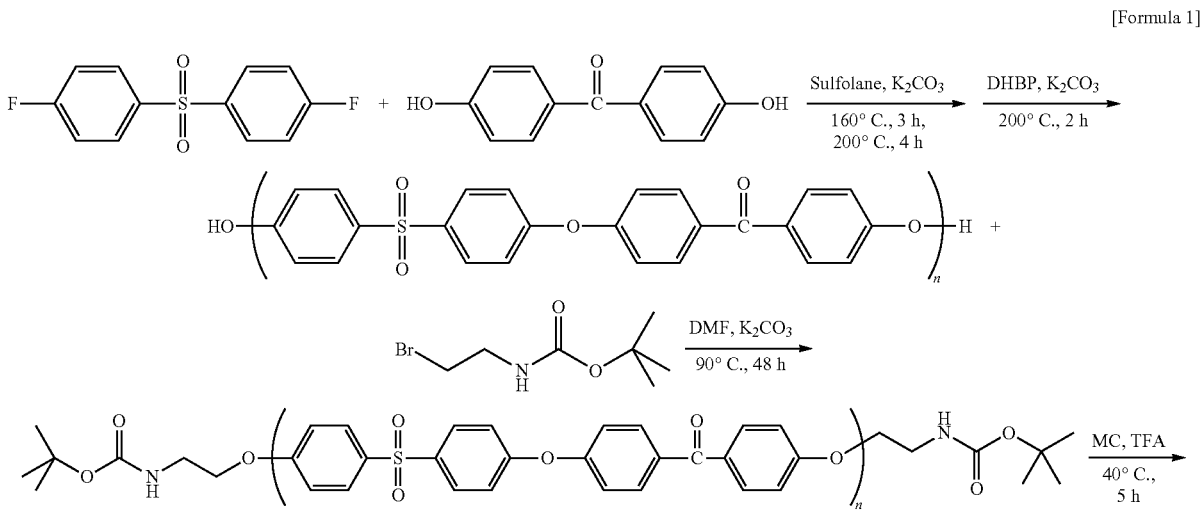

-continued

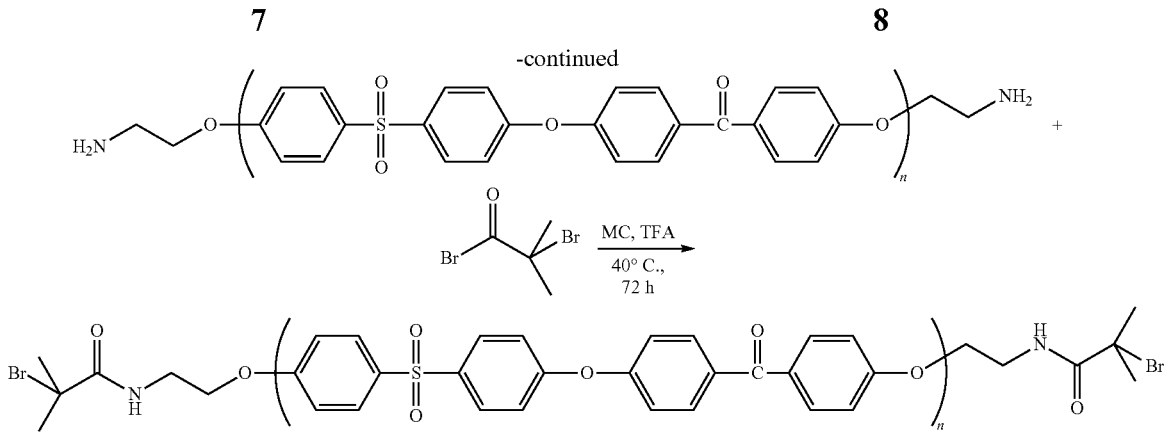

Accordingly, the poly(arylene sulfone ether ketone) macroinitiator was synthesized by four steps such as the synthesis of poly(arylene sulfone ether ketone), the substitution of the end group with an amine group protected by a butoxycarbonyl group (Boc), the removal of the protecting butoxycarbonyl group (Boc), and the introduction of bromine into the end group.

In a first exemplary embodiment, condensation polymerization was used to synthesize the poly(arylene sulfone ether ketone) in the form of a rod having excellent thermal and mechanical stability. 5.085 g (0.02 mol) of 4,4'-difluorodiphenylsulfone (DFDS), 4.328 g (0.02 mol) of 4,4'-dihydroxybenzophenone (DHBP), and 2.9024 g (0.021 mol) of $K_2CO_3$ were placed in a three-necked round flask, and sulfonate was added thereto under argon atmosphere to from a uniform solution. In a further exemplary embodiment, the resulting solution was subjected to a reaction at 190° C. for 3 hours and at 220° C. for 3 hours. Preferably, in order to completely convert both ends into hydroxyl groups, an excess of dihydroxybenzophenone (DHBP) was dissolved in sulfonate, and the resulting solution was suitably injected into a reaction flask and subjected to a reaction for 2 hours. The synthesized polymer solution was precipitated in methanol and filtered through filter paper. The precipitate was washed with an excess of water and methanol and dried in a vacuum oven at 90° C. for 2 days (7.76 g, yield=82.5%).

In another further preferred embodiment, substitution reaction using 2-(Boc-amino)ethyl bromide was suitably applied to the introduction of an amine group into the end. First, 6.00 g (2.40×10−4 mol) of PSEK and 0.0398 g (2.88×10−4 mol) of $K_2CO_3$ were placed in a three-necked round flask equipped with a funnel, and 90 ml of anhydrous dimethylformamide (DMF) was added thereto under argon atmosphere and stirred at 90° C. for 1 hour. 0.0430 g (1.92×10−4 mol) of 2-(Boc-amino)ethyl bromide was placed in a pear-shaped two-necked flask and dissolved in 10 ml of anhydrous DMF. Preferably, the resulting solution was placed in a dropping funnel to be dropped for 1 hour. In a further related embodiment, the reaction was continued for 2 days, and the resulting solution was precipitated in methanol to obtain a modified polymer (5.66 g, yield=72.9%).

In order to remove the butoxycarbonyl group from the amine group protected by the butoxycarbonyl group (Boc), 5.66 g (2.26×10−4 mol) of the modified PSEK was placed in a two-necked flask, and 90 ml of purified methylene chloride was added thereto under argon atmosphere. Next, 3.36 ml (4.53×10−2 mol) of trifluoroacetic acid was added thereto, and the resulting solution was stirred at 40° C. for 3 hours. Subsequently, the reaction flask was immersed in an ice bath to remove all the solvents and reactants under reduced pressure, the residual product was dissolved again in methylene, and the resulting solution was dissipated in methanol and filtered, thereby obtaining a precipitate (4.13 g, yield=73.0%).

In another exemplary embodiment, finally, bromine, which belongs to the halogen family, was introduced to the end of the modified PSEK to form an initiator for atom transfer radical polymerization (ATRP). First, 4.13 g (1.65×10−4 mol) of the modified PSEK was placed in a three-necked flask, and 120 ml of DMF was added thereto under argon atmosphere. The resulting solution was sufficiently stirred to form a uniform solution, and then 0.920 ml (6.61×10−3 mol) of triethylamine was added thereto. After stirring for about 30 minutes, 0.817 ml (6.61×10−3 mol) of α-bromoisobutyryl bromide was slowly added thereto.

The resulting solution was subjected to a reaction at 50° C. for 2 days, and precipitated in methanol and filtered, thus obtaining the product (40.5 g, yield=98.0%).

Preparation Example 2

Synthesis of PSEK-b-poly(styrene-co-acrylonitrile)

The overall synthesis method according to another exemplary embodiment is represented by the following formula 2:

[Formula 2]

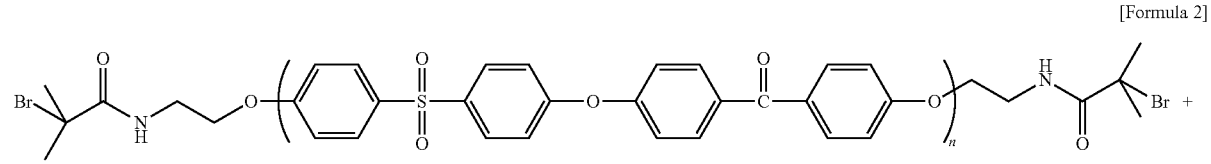

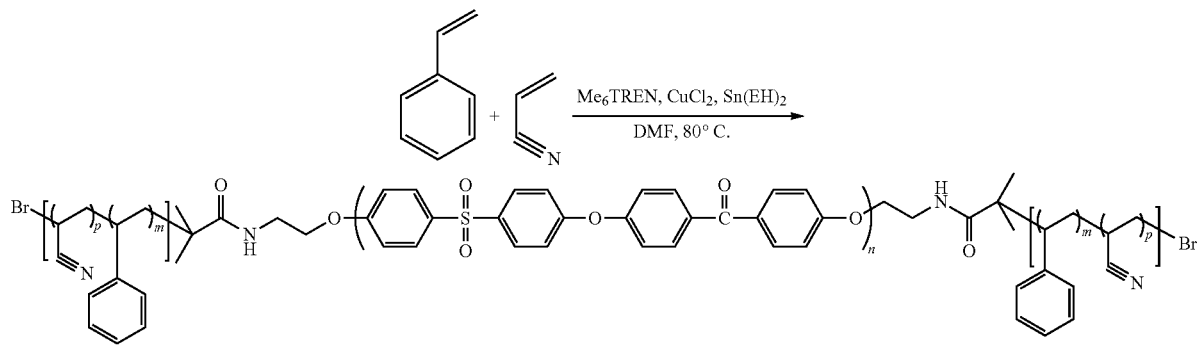

A PSEK-b-poly(styrene-co-acrylonitrile) (PSEK-b-PSAN) block copolymer was synthesized by copolymerizing the PSEK macroinitiator, which was synthesized by an activator regenerated by electron transfer atom transfer radical polymerization (ARGET ATRP), with styrene and acrylonitrile. In a first exemplary embodiment, 0.549 mg (4.08×10−6 mol) of $CuCl_2$ was placed in a Schlenk flask, and the flask was degassed under vacuum and filled with argon two times. Then, 15.6 ml (1.36×10−1 mol) of purified styrene, 5.82 ml (8.84×10−2 mol) of acrylonitrile, and 33.9 μl (1.22×10−4 mol) of Me6TREN were added thereto and sufficiently stirred. In a further preferred embodiment, the resulting solution was subjected to a freeze-pump-thaw process two times to remove the dissolved oxygen in the reaction flask. 0.400 g (1.6×10−2 mol) of the PSEK macroinitiator was placed in a pear-shaped flask and 15 ml of DMF was added thereto to dissolve the PSEK macroinitiator. Next, the resulting solution was also subjected to the freeze-pump-thaw process three times.

Preferably, the solution in which the macroinitiator was suitably dissolved was placed in the reaction flask, and the reaction was carried out at 80° C. for 6, 12, and 24 hours.

Preferably, the reaction was terminated by exposing the resulting solution to the air. Subsequently, the resulting solution was suitably diluted with methylene chloride and passed through a column filled with $AL_2O_3$ to remove the copper matrix. Finally, the resulting solution was precipitated in methanol, filtered, and dried, thus obtaining the PSEK-b-poly(styrene-co-acrylonitrile) (PSEK-b-PSAN) block copolymer. The degree of polymerization of the PSAN was controlled by varying the reaction time to 1, 2, and 3 hours. The total molecular weight was 30 kg/mol in the case where the polymerization time was 1 hour, 45 kg/mol in the case of 2 hours, and 60 kg/mol in the case of 3 hours. The block copolymer had a relatively low PDI. The block copolymer having the total molecular weight of 30 kg/mol was called sample P30, 45 kg/mol was called sample P45, and 60 kg/mol was called sample P60.

Preparation Example 3

Introduction of Sulfonic Acid Group into PSEK-b-poly(styrene-co-acrylonitrile)

The entire introduction method according to further exemplary embodiments is represented by the following formula 3:

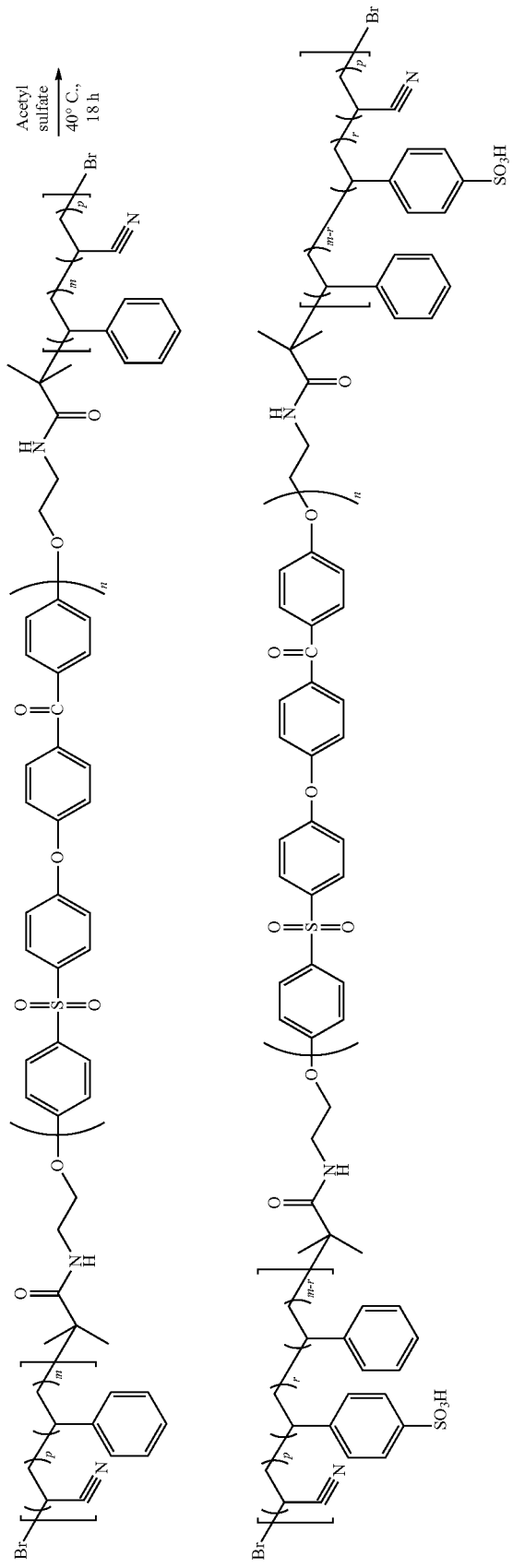
[Formula 3]

Sulfonation reaction was carried out to introduce a hydrophilic group into the block copolymer. First, 5 ml of purified methylene chloride and 0.95 ml (1.00×10−2 mol) of acetic anhydride were placed in a two-necked round flask to prepare 1 M of acetyl sulfate, a reactant for the sulfonation. 0.35 ml (6.57×10−3 mol) of sulfuric acid was slowly added thereto under ice bath.

The block copolymer to be sulfonated was placed in a two-necked flask and dissolved in 20 ml of purified methylene chloride. While maintaining the reaction temperature at 55° C., 1 M of acetyl sulfate was added 0.6 to 1.2 times the number of styrene in each block and refluxed for 4 hours. Methanol was added to the solution to terminate the reaction, and all the solvents were removed under reduced pressure. The thus obtained polymer was washed with a sufficient amount of water and methanol until the pH was neutral.

Block copolymers having different degrees of sulfonation according to the amount of acetyl sulfate used were obtained. The block copolymer having a degree of sulfonation of about 2% was called sample S2, about 3% was called sample S3, about 4% was called sample S4, about 6% was called sample S6, about 7% was called sample S7, and about 9% was called sample S9.

Preparation Example 4

Preparation of Electrolyte Membrane

According to another further exemplary embodiment, the synthesized polymers were dissolved in dimethylformamide (DMF) to have a concentration of 10 wt % and the temperature was maintained at 80° C. In order to remove undissolved impurities, the solutions were filtered through 0.45 μm PTFE syringe filter, and each filtrate was cast on a glass plate using a doctor blade method. The cast electrolyte membrane was suitably dried in an oven at 40° C. under nitrogen atmosphere for 2 days, and further dried in a vacuum oven at 50° C. for 2 days to completely remove the remaining solvent.

Preferably, the cast electrolyte membrane was subjected to solvent annealing under DMF vapor atmosphere. 0.5 ml of DMF was placed in a schale and a schale on which the membrane was put was placed thereon. The scales were covered and placed in an oven at 50° C. and treated under DMF vapor atmosphere for a total of 2 days and then dried.

Test Example 1

Structure Analysis and Molecular Weight Measurement of Synthesized Polymers

1H NMR (Bruker Avance 300) and FT-IR (JASCO, FT/IR-660 plus) were used to analyze the structures of the synthesized polymers. Moreover, elemental analysis was carried out with CE instrument EA1110 to examine the degree of sulfonation. Preferably, the analysis of molecular weights and molecular weight distributions was carried out using a gel permeation chromatograph (Waters, GPC 250). GPC measurement was carried out using tetrahydrofuran (THF) as a developing solution, and monodisperse polystyrene (PS) was used as a standard for the calibration.

Test Example 2

Measurement of Water Uptake and Ion Exchange Capacity (IEC)

In order to measure the water uptake of the electrolyte membranes, the weight (Wdry) of the electrolyte membranes dried in a vacuum oven at 30° C. was measured. Next, in order to measure the weight (Wwet) of the electrolyte membranes in a wet state, the dried electrolyte membranes were suitably immersed in distilled water at room temperature for about one day to maintain the equilibrium state. Then, the water on the surface was removed and their weights (Wwet) were measured. The water uptake was calculated by the following formula:

$$\text{Water uptake} = \frac{W_{wet} - W_{dry}}{W_{dry}} \times 100$$

In order to measure the ion exchange capacity (IEC) of the electrolyte membranes, the electrolyte membranes were immersed in 2.0 M Nacl solution for about two days, and the resulting solution was titrated with 0.025 M NaOH solution. Phenolphthalein was used as an indicator. After the titration, the electrolyte membranes were washed with distilled water and dried in a vacuum oven at 30° C., and their weights (Wdry) were measured. The ion exchange capacity (IEC) was calculated by the following formula:

$$IEC = \frac{N_{NaOH} M_{NaOH}}{W_{dry}}$$

wherein $V_{NaOH}$ represents the volume of NaOH solution used during the titration and $M_{NaOH}$ represents the molar concentration of MNaOH=NaOH solution.

Test Example 3

Measurement of Hydrogen Ion Conductivity of Electrolyte Membranes

The hydrogen ion conductivity of the electrolyte membranes was measured using a potentiostat (Biologic, VMP3) by impedance analysis. In order to measure the conductivity, the electrolyte membrane was mounted in a Bekktech conductivity cell, and the environmental conditions in the cell such as temperature and relative humidity were controlled using a fuel cell station (Wonatech, Smart fuel cell state station). The hydrogen ion conductivity was calculated by the following formula:

$$\sigma = \frac{L}{Rwd}$$

wherein L represents the distance between electrodes, R represents the resistance of the membrane, w represents the width of the membrane, and d represents the thickness of the membrane.

Test Example 4

Measurement of Dimensional Stability of Electrolyte Membranes

The dimensional stability of the electrolyte membranes was measured by measuring the thickness and length of the membranes in a dry state and measuring the increased thickness and length thereof after being immersed in distilled water at room temperature for about one day based on the following formula:

$$\Delta l = \frac{l - l_0}{l_0} \text{ and } \Delta t = \frac{t - t_0}{t_0}$$

wherein l represents the length of the membrane in a wet state, l0 represents the length of the membrane in a dry state, t represents the thickness of the membrane in a wet state, and t0 represents the thickness of the membrane in a dry state.

Evaluation 1

Evaluation of Poly(arylene sulfone ether ketone) Macroinitiator

Figure 2:
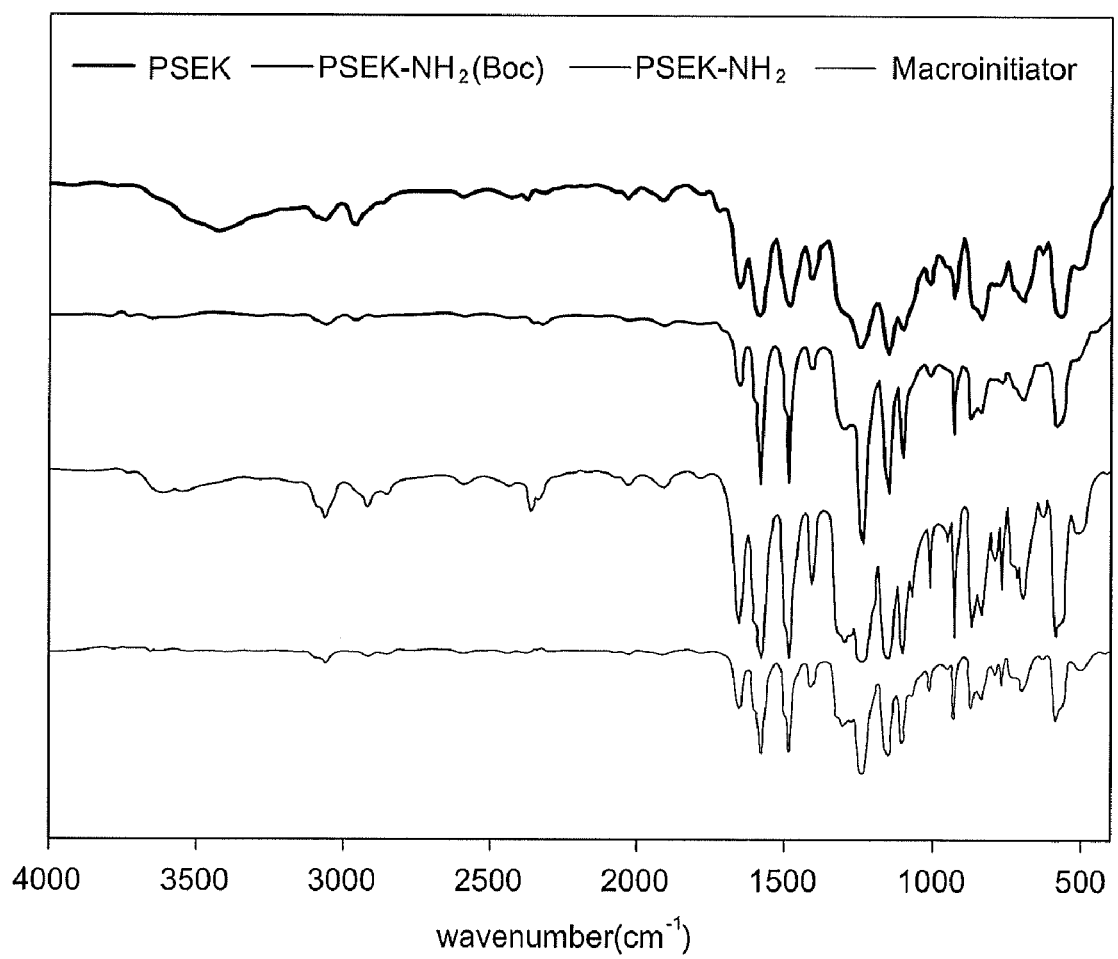
FIG. 2 shows FT-IR spectra in a process of synthesizing the PSEK macroinitiator in Example 1.

The chemical structure and 1H NMR spectra of the PSEK macroinitiator synthesized in Preparation Example 1 are shown in FIG. 1. Moreover, the FT-IR spectra in each step are shown in FIG. 2 for an accurate analysis. First, it could be confirmed from the 1H NMR analysis that the PSEK was modified to the macroinitiator for the atom transfer radical polymerization (ATRP). Moreover, this result could be also obtained by the FT-IR analysis, from which it could be seen that a sharp —OH stretching peak at 3,500 cm$^{-1}$ was shown in the PSEK which was not modified. However, in the case where the end of the PSEK was modified with the amine group protected by the butoxycarbonyl group (Boc), it could be seen that the —OH peak completely disappeared. After the removal of the protecting butoxycarbonyl group (Boc), a double peak at 3,300 cm$_{-1}$ and 3,500 cm$_{-1}$, which appeared in a primary amine, was observed. And, after the bromination, a stretching peak at 1,601 cm$_{-1}$, which appeared in C=O in an amide, was shown.

Evaluation 2

Evaluation of PSEK-b-poly(styrene-co-acrylonitrile)

Figure 3:
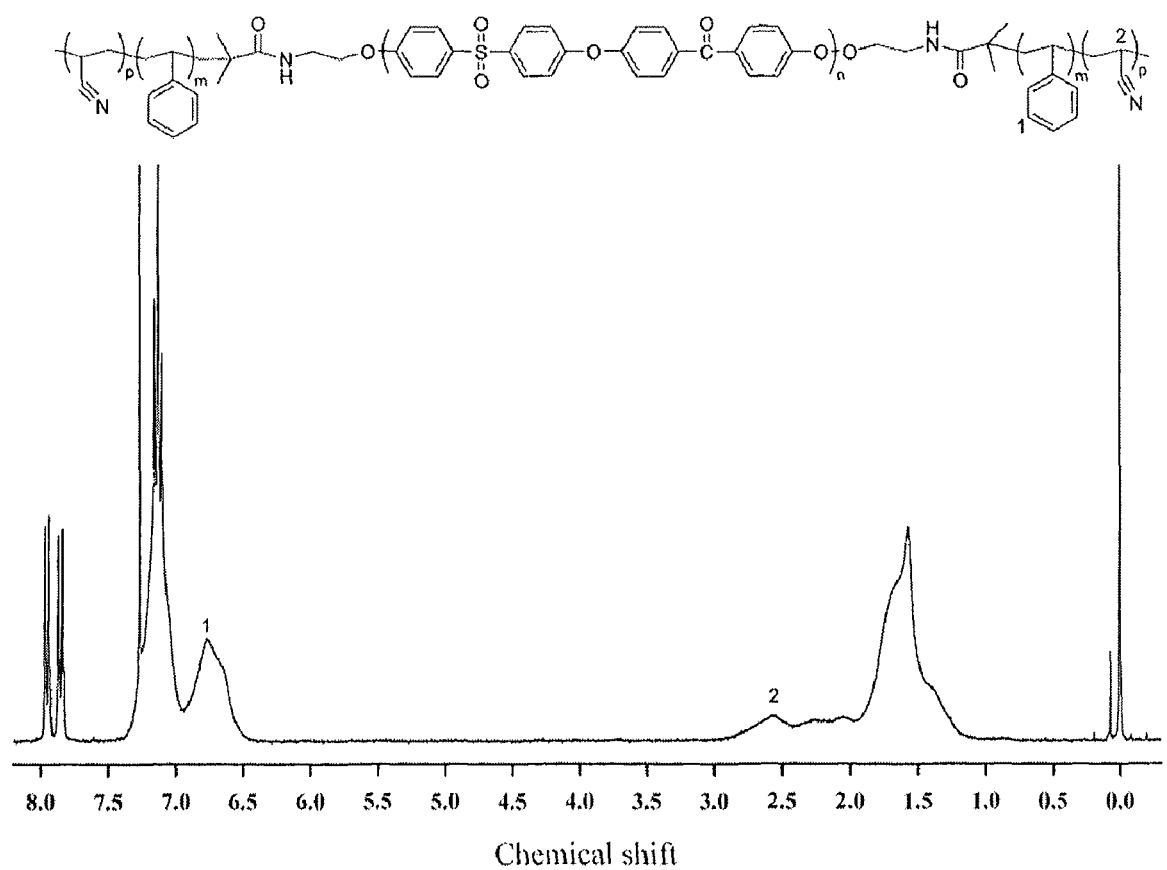
FIG. 3 shows the chemical structure of PSEK-b-PSAN in Example 2 and its 1H NMR spectra.

The chemical structure and 1H NMR spectra of the PSEK-b-poly(styrene-co-acrylonitrile) synthesized in Preparation Example 2 are shown in FIG. 3, from which it could be confirmed that the styrene and the acrylonitrile were well copolymerized.

Figure 4:
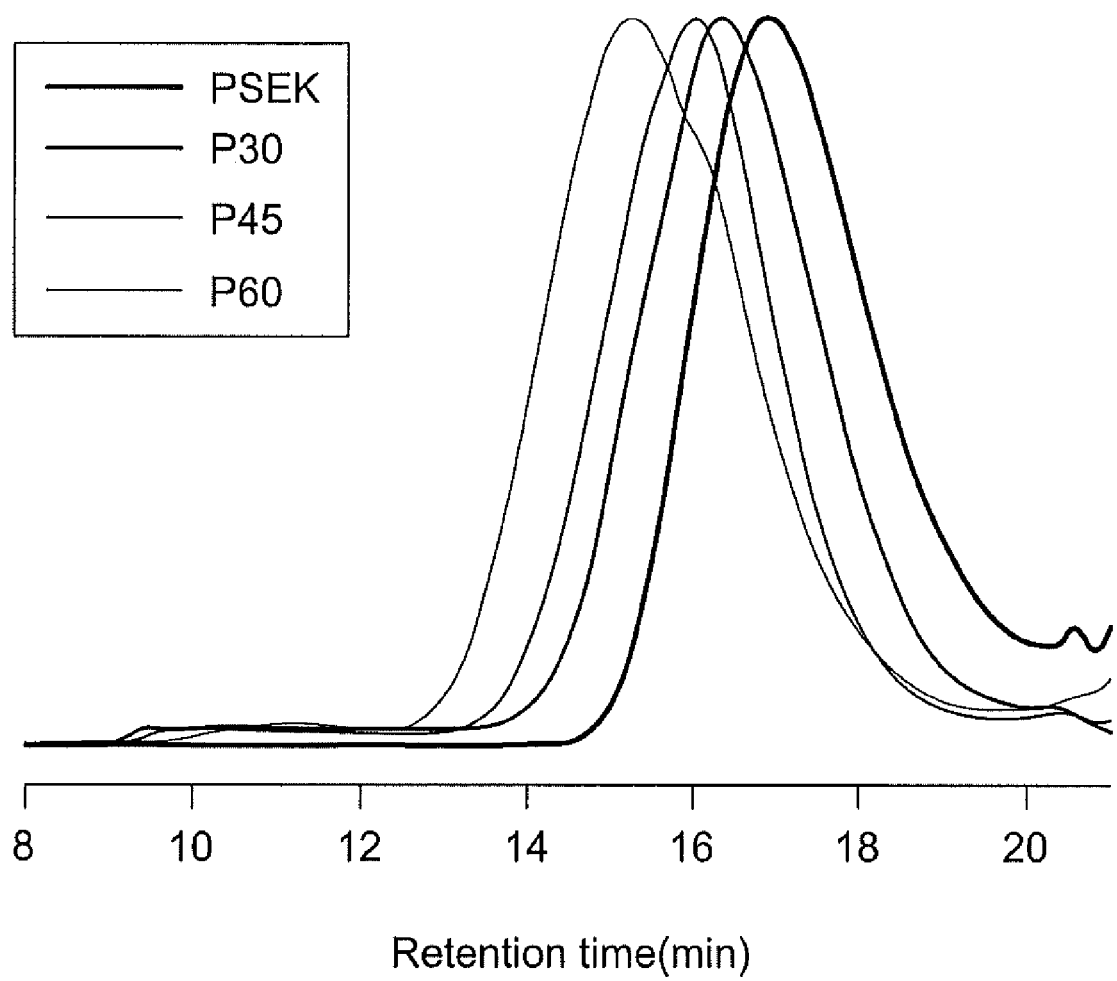
FIG. 4 shows the molecular weights and PDI values of block copolymers in Example 2.

The molecular weights and the molecular weight distributions of the synthesized block copolymers were confirmed by GPC analysis. GPC data of the synthesized block copolymers are shown in FIG. 4, and the PDI values are shown in the following table 1:

TABLE 1

| Sample | Mn (kDa) | Mw (kDa) | PDI |
|---|---|---|---|
| PSEK | 18 | 27 | 1.52 |
| P30 | 30 | 49 | 1.63 |
| P45 | 45 | 78 | 1.73 |
| P60 | 59 | 110 | 1.86 |

Evaluation 3

Figure 5:
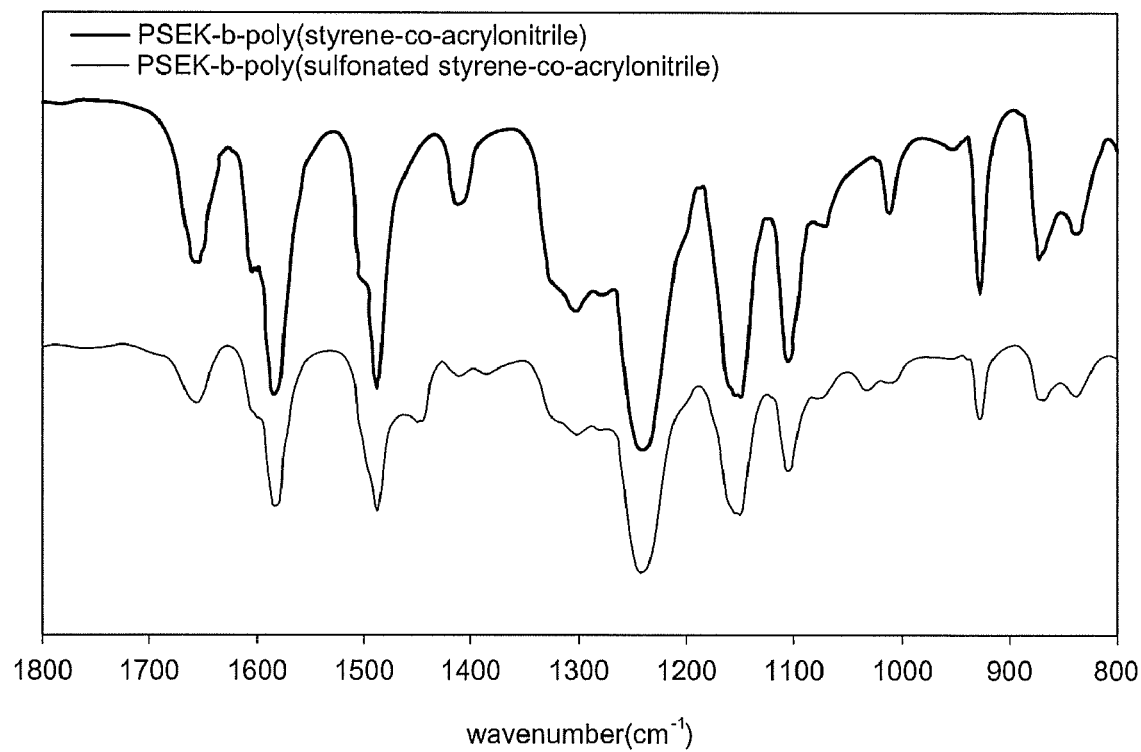
FIG. 5 shows the chemical structure of PSEK-b-PSAN in Example 3 and its FT-IR spectra.

Evaluation of PSEK-b-poly(styrene-co-acrylonitrile) into which Sulfonic Acid Group was Introduced The chemical structure and its FT-IR spectra of the PSEK-b-poly(styrene-co-acrylonitrile) into which the sulfonic acid group was introduced in Preparation Example 3 are shown in FIG. 5. It could be confirmed from the absorption peak which appeared when the peak of the sulfonic acid S=O at 1,398 cm$^{-1}$ was substituted in the para-position of a phenyl ring, which occurred at 1,004 cm$^{-1}$, that the sulfonation was successfully carried out.

Evaluation 4

Evaluation of Electrolyte Membranes

The degrees of sulfonation, the water uptake values, and the theoretical and experimental ion exchange capacity (IEC) values of the electrolyte membranes synthesized in Preparation Example 4 are shown in the following table 2.

According to certain exemplary embodiments of the present invention, it could be seen that the water uptake was generally increased as the IEC value was increased. Further, after comparing the theoretical IEC values with those measured by titration, it could be confirmed that the measured values were generally lower than the theoretical values. A reason for this is considered that the sulfonic acid group, which was completely wrapped in the polymer matrix, was present. The dimensional stability of each sample is also shown in the following table 2, below. It can be seen that the newly synthesized electrolyte membranes exhibit a very high stability compared to Nafion 117 in which $\Delta l=0.117$ and $\Delta t=0.01$.

TABLE 2

| Sample | Degree of Sulfonation (%) | Water uptake (%) | Theoretical IEC (mmol/g) | Experimental IEC (mmol/g) | Δt | Δl |
|---|---|---|---|---|---|---|
| P30S3 | 2.5 | 4.8 | 0.12 | 0.11 | <0.01 | <0.01 |
| P30S4 | 4.2 | 6.0 | 0.22 | 0.21 | <0.01 | <0.01 |
| P30S7 | 7.2 | 8.5 | 0.39 | 0.37 | <0.01 | <0.01 |
| P45S3 | 2.7 | 3.1 | 0.14 | 0.12 | <0.01 | <0.01 |
| P45S6 | 6.5 | 5.8 | 0.32 | 0.30 | <0.01 | <0.01 |
| P45S9 | 9.3 | 8.0 | 0.49 | 0.45 | <0.01 | <0.01 |
| P60S2 | 1.9 | 5.5 | 0.08 | 0.08 | <0.01 | <0.01 |
| P60S6 | 5.5 | 7.6 | 0.26 | 0.25 | <0.01 | <0.01 |
| P60S9 | 9.1 | 9.1 | 0.45 | 0.43 | <0.01 | <0.01 |

Figure 6:
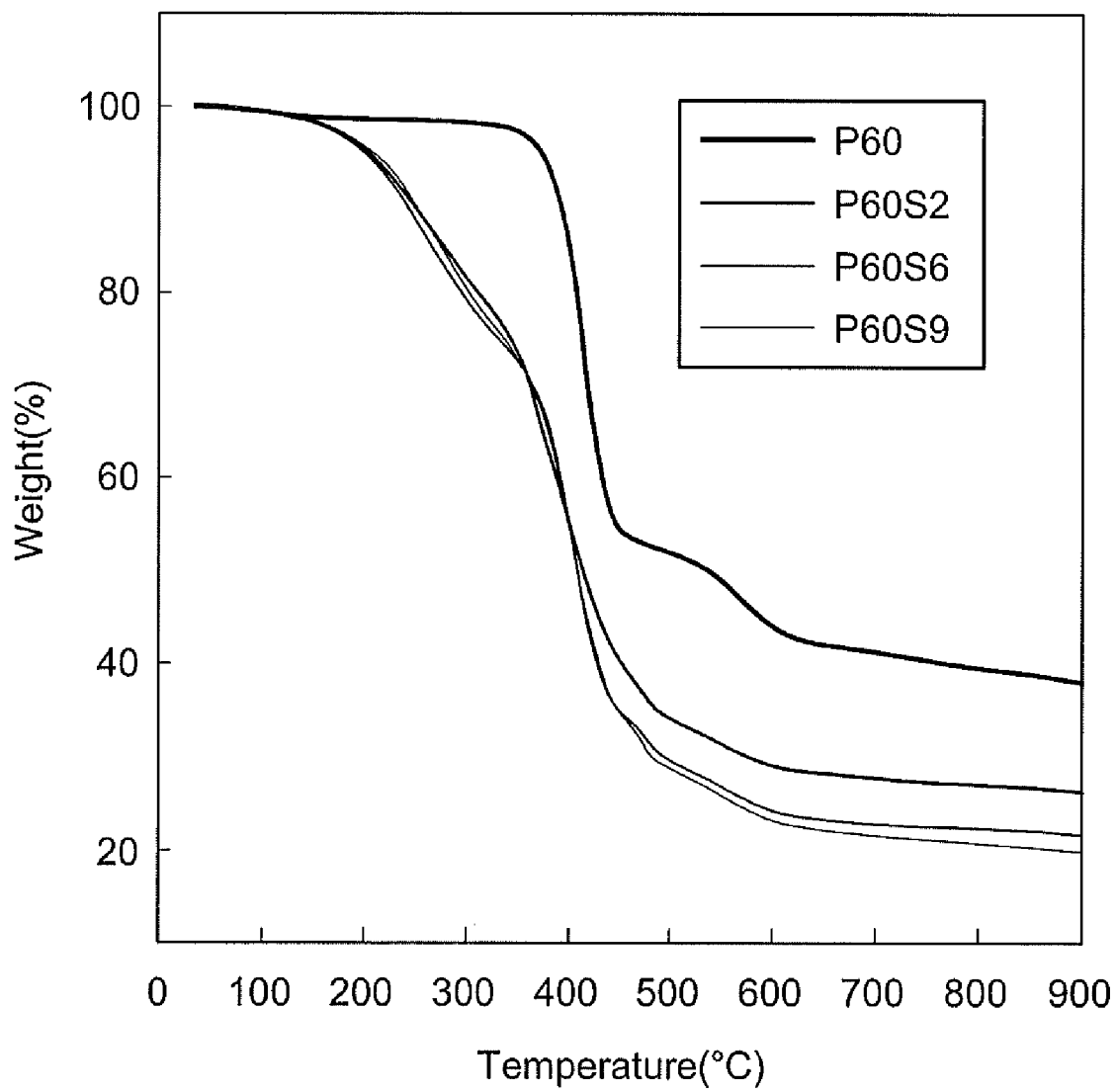
FIG. 6 shows the results of thermogravimetric analysis for electrolyte membranes in Example 4.

Thermogravimetric analysis (TGA) was carried out to measure the thermal stability at high temperatures. FIG. 6 shows a change in mass according to the temperature of samples P60. The change in mass was observed in a total of four steps. The change in mass observed between 30 to 120° C. was caused by the residual water. According to other further embodiments of the present invention, the change in mass observed between 170 to 290° C. was caused by the degradation of sulfonic acid. And, the changes in mass observed at temperatures of 350° C. and 450° C., and over 450° C. were caused by the direct decomposition of PSAN and PSEK. Based on these results, it can be concluded that the electrolyte membranes synthesized according to the present invention have high thermal stability comparable to that of other high-temperature polymer electrolyte membrane fuel cells. As a result, it can be confirmed that the electrolyte membrane of the present invention can be applied at a temperature of more than 130° C., which is considered as an ideal operating temperature range of the polymer electrolyte membrane fuel cell (PEMFC).

Figure 7:
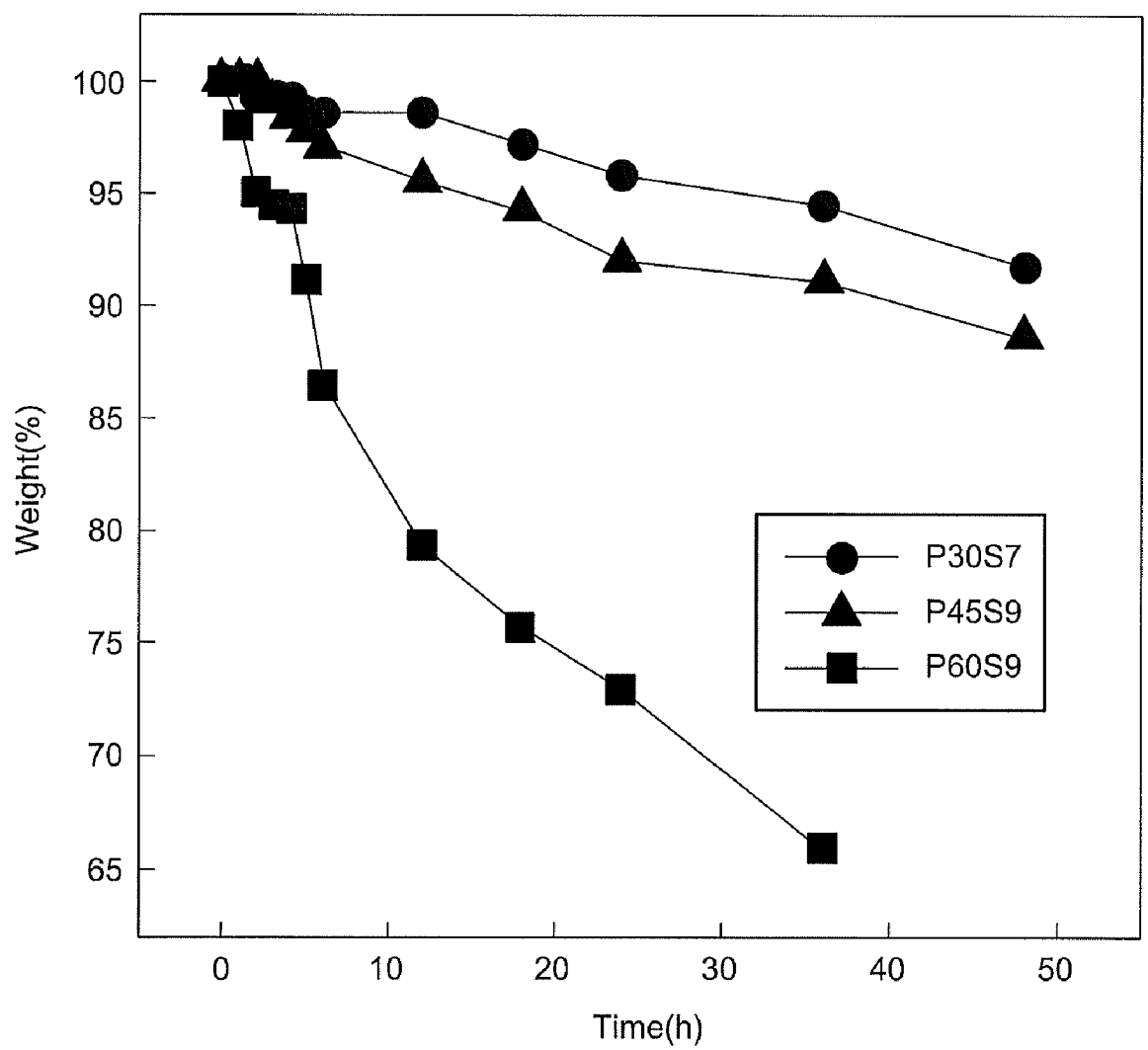
FIG. 7 shows a change in mass in the presence of Fenton's reagent for the electrolyte membranes in Example 4.
Figure 10:
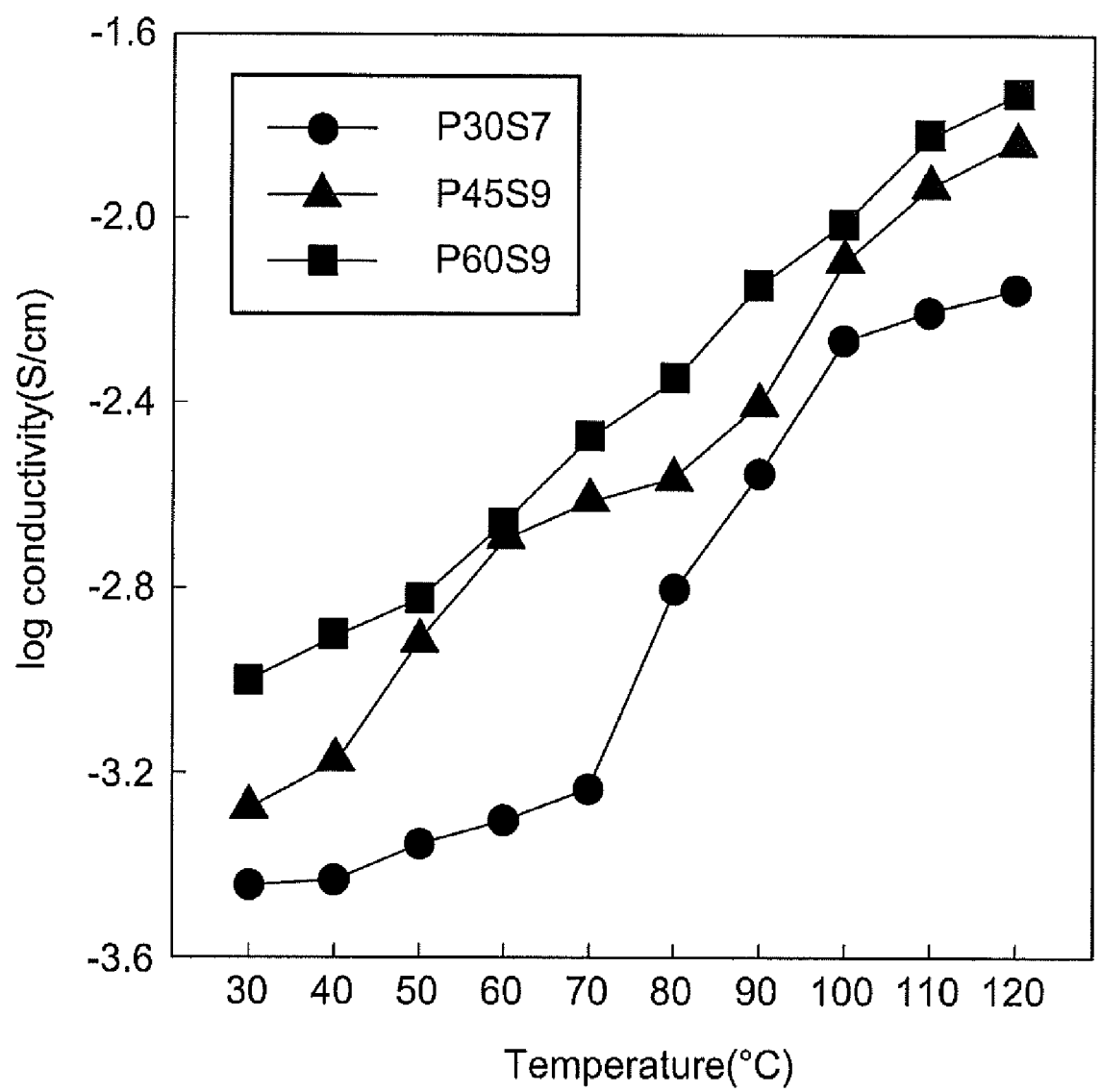
FIG. 10 shows a change in ion conductivity (100% RH) according to the length of a hydrophilic chain (PSAN).

Next, according to further preferred embodiments, the changes in mass and form of the membranes in the presence of Fenton's reagent were observed to measure the chemical stability. According to other exemplary embodiments of the present invention and as shown in FIG. 10, for example, FIG. 7 shows the change in mass according to the elapse of time.

Preferably, the forms of the membranes were well maintained even within about 30 hours, and the degree of change in mass was not so high, from which it could be seen that the membranes had excellent chemical stability compared to the existing styrene-based polymers.

Figure 8:
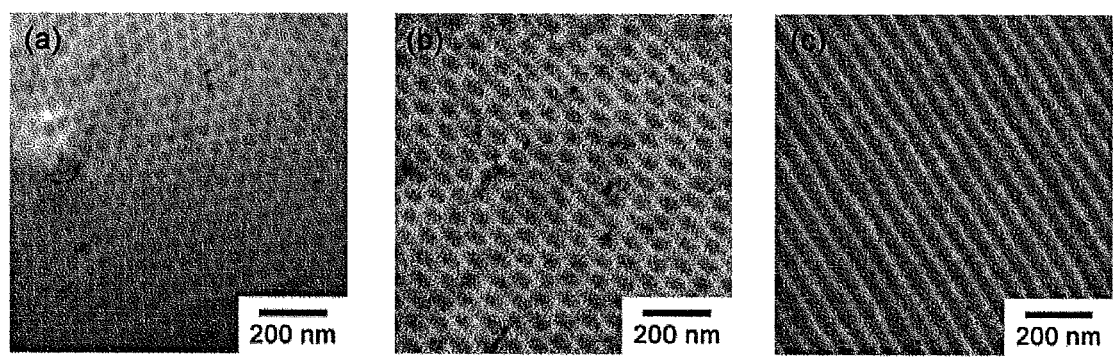
FIG. 8A shows a TEM image of sample P30S7.
FIG. 8B shows a TEM image of sample P45S9.
FIG. 8C shows a TEM image of sample P60S9.
Figure 9:
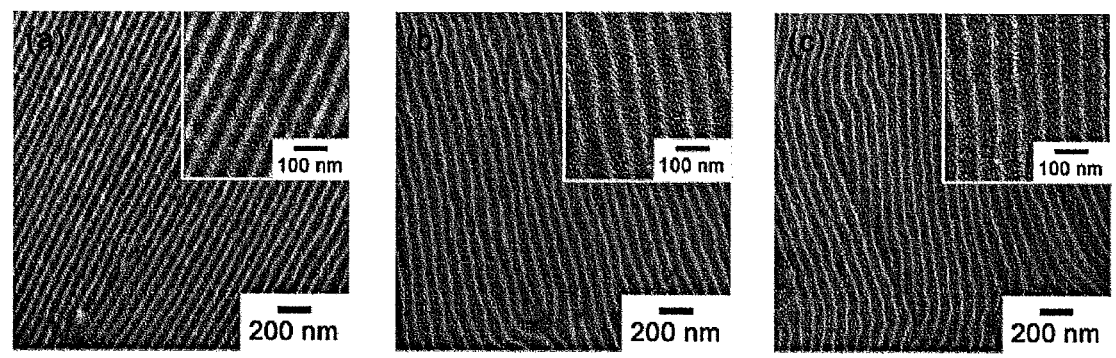
FIG. 9A shows a TEM image of sample P60S2.
FIG. 9B shows a TEM image of sample P60S6.
FIG. 9C shows a TEM image of sample P60S9.

The cross-sectional images of the electrolyte membranes were examined using TEM as shown in FIGS. 8 and 9. Preferably, a solvent annealing process was used to further improve the microphase separation. The black areas shown in the TEM images corresponded to the hydrophilic component, and the white areas corresponded to the hydrophobic component. It was considered that the difference of contrast was caused by electron rich groups such as the sulfonic acid and acrylonitrile bonded to the hydrophilic component.

According to other exemplary embodiments of the present invention and as shown in FIG. 8, for example, FIG. 8 shows the change in structure according to the chain length of the hydrophilic component, from which it could be seen that a variety of structural changes were observed according to the chain lengths. In certain preferred embodiments, for example, in the case of sample PS0S7 having the shortest length of the hydrophilic chain, a hexagonal (HEX) structure was observed. In other preferred embodiments, for example, in the case of sample P45S9, a hexagonally perforated lamellar (HPL) structure was observed. And, in other preferred embodiments, in the case of sample P60S9 having the longest length of the hydrophilic chain, a lamellar structure was observed in a wide range of 1 micro×1 micro.

In certain exemplary embodiments of the present invention and as shown in FIG. 9, for example, FIG. 9 shows the change in structure according to the degree of sulfonation in the sulfonated samples P60. As shown in FIG. 9, the lamellar spacing was increased with the increase in the degree of sulfonation (56.7 nm, 62.9 nm, and 65.7 nm). The reason for this is considered that bulky sulfonic acid groups were introduced.

In further preferred embodiments, the change in hydrogen ion conductivity at a relative humidity (RH) of 100% was measured. In all of the samples, the conductivity was not suitably reduced at a temperature of more than 100° C. but continuously increased, which was caused by the high thermal stability of the polymers.

According to other exemplary embodiments of the present invention and as shown in FIG. 10, for example, FIG. 10 shows the change in conductivity at a relative humidity (RH) of 100% according to the length of the hydrophilic chain. Sample P60S9 having the lamellar structure in the entire temperature range had the highest hydrogen ion conductivity. Sample P45S9 having the HPL structure had higher hydrogen ion conductivity and sample P30S7 having the HEX structure had high hydrogen ion conductivity.

Figure 11:
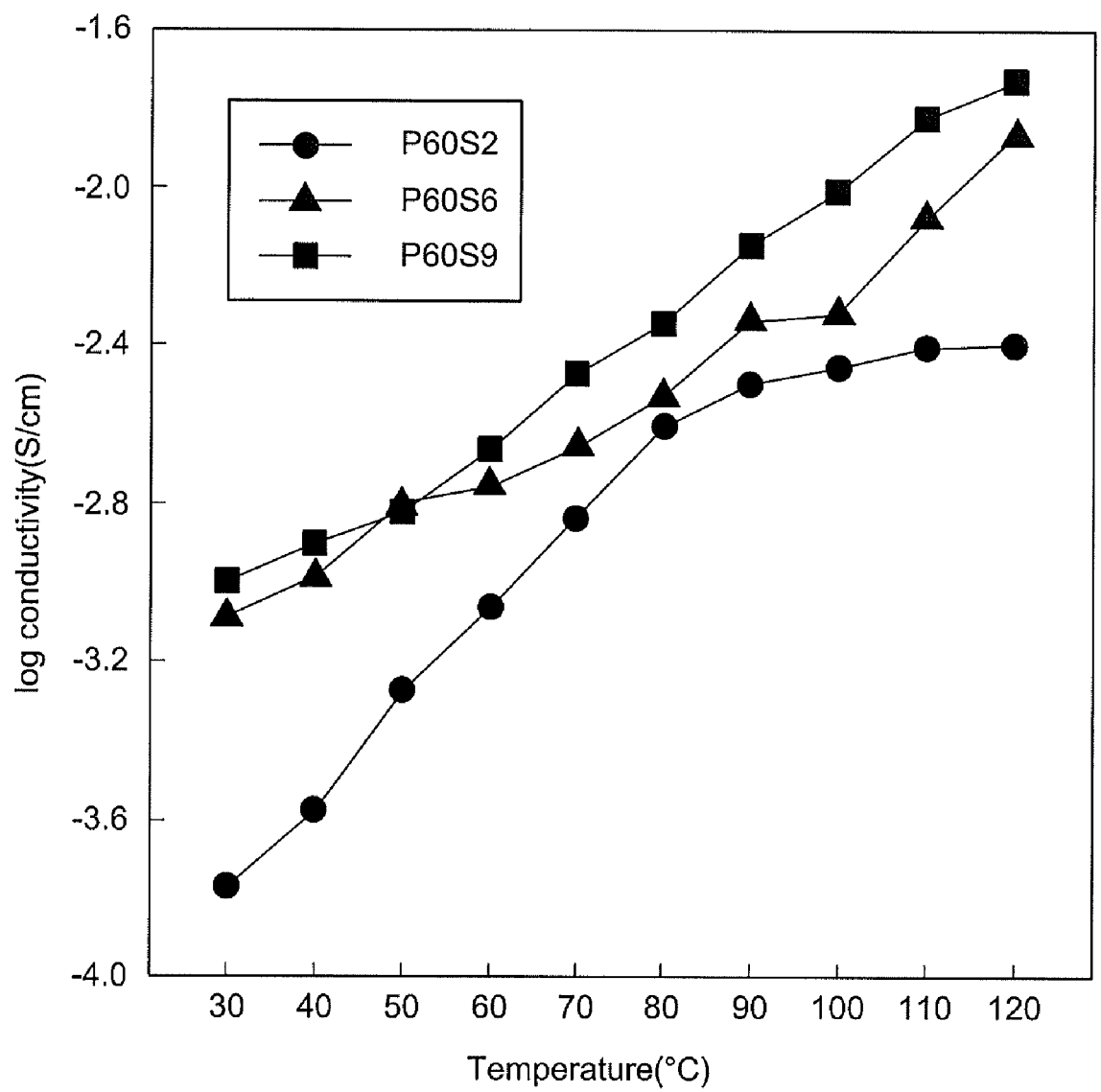
FIG. 11 shows a change in ion conductivity (100% RH) according to the degree of sulfonation.

According to certain exemplary embodiments and as shown in FIG. 11, for example, FIG. 11 shows the change in hydrogen ion conductivity at a relative humidity (RH) of 100% according to the degree of sulfonation. Generally, the hydrogen ion conductivity is directly proportional to the degree of sulfonation since the hydrogen ion carrier is suitably increased with the increase in the degree of sulfonation. As shown in FIG. 11, sample P60S2 (0.08 mmol/g) having the lowest degree of sulfonation exhibited the lowest ion conductivity. Preferably, the activation energy of hydrogen ion migration could be suitably calculated from the graph, and this sample had a higher value than 27.4 kJ/mol of the Nafion membrane. However, the sulfonated PEEK, a random copolymer (1.2 mmol/g) having a higher ion exchange capacity (IEC), had the activation energy similar to that of the samples of the present invention, from which it could be confirmed that well-connected hydrophilic channels were formed. Moreover, regardless of the degree of sulfonation, the ion conductivity was also increased continuously with the increase in temperature.

As described herein, the amphiphilic block copolymer of the present invention has excellent thermal and mechanical stability. Especially, when the amphiphilic block copolymer is used as the electrolyte membrane for a polymer electrolyte membrane fuel cell (PEMFC), it has high hydrogen ion conductivity and exhibits excellent thermal, chemical, and mechanical stability even at high temperatures, and thus it can be effectively used in the PEMFC which requires high-temperature operating conditions.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A block copolymer comprising at least one of each of a hydrophobic component having a structure represented by the following general formula 1 and a hydrophilic component having a structure represented by the following general formula 2:

[General Formula 1]

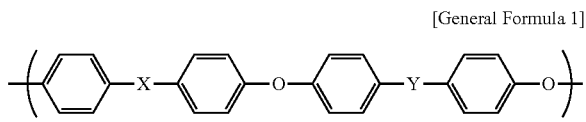

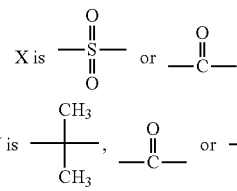

[General Formula 2]

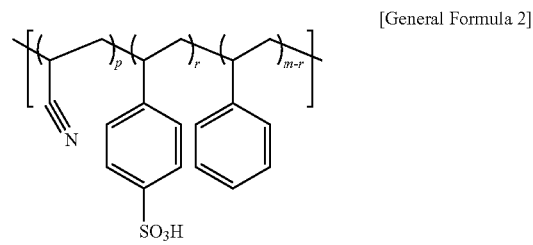

wherein, p, m, and r are independent integers, and m is greater than r (m>r).

2. The block copolymer of claim 1, wherein the hydrophilic component is included in an amount of 50 to 300 parts by mass with respect to 100 parts by mass of the hydrophobic component.

3. The block copolymer of claim 2, wherein the hydrophilic component is included in an amount of 250 to 300 parts by mass with respect to 100 parts by mass of the hydrophobic component.

4. The block copolymer of claim 1, wherein the degree of sulfonation is 1 to 10%.

5. A method for manufacturing an amphiphilic block copolymer, the method comprising:
modifying poly(arylene sulfone ether ketone) (PSEK) to a PSEK macroinitiator;

synthesizing a PSEK-b-poly(styrene-co-acrylonitrile) (PSEK-b-PSAN) block copolymer by copolymerizing the PSEK macroinitiator with styrene and acrylonitrile; and sulfonating the PSEK-b-PSAN block copolymer.

6. The method of claim 5, wherein the modification of the PSEK to the PSEK macroinitiator comprises:

substituting an end group of the PSEK with an amine group protected by a butoxycarbonyl group (Boc);

removing the protecting butoxycarbonyl group (Boc); and introducing bromine into the end group.

7. The method of claim 5, wherein the synthesis of the PSEK-b-PSAN) block copolymer comprises:

mixing and stirring styrene, acrylonitrile, and Me6TREN; and adding the PSEK macroinitiator to the stirred solution to be polymerized.

8. The method of claim 5, wherein the sulfonation of the PSEK-b-PSAN block copolymer comprises:

dissolving the PSEK-b-PSAN block copolymer in methylene chloride; and mixing the methylene chloride with acetyl sulfate.

9. A polymer electrolyte comprising the copolymer of claim 1.

10. A polymer electrolyte membrane comprising the polymer electrolyte of claim 9.

* * * * *